United States Patent [19]

Witzke et al.

[11] 4,118,547

[45] Oct. 3, 1978

[54] THIN FILM PHOTOGALVANIC CELL

[75] Inventors: Horst Witzke, Princeton; Schoen-nan Chen, North Brunswick; Satyendra K. Deb, East Brunswick, all of N.J.; Steven Robert Jost, Huntington, N.Y.; Joseph Reichman, Great Neck, N.Y.; Michael A. Russak, Farmingdale, N.Y.

[73] Assignees: Optel Corporation, Princeton, N.J.; Grumman Aerospace Corporation, Bethpage, N.Y.; part interest to each

[21] Appl. No.: 763,073

[22] Filed: Jan. 27, 1977

[51] Int. Cl.² .................... H01M 6/30; H01M 6/36
[52] U.S. Cl. ................................................. 429/111
[58] Field of Search ..................................... 429/111

[56] References Cited

U.S. PATENT DOCUMENTS

| 3,925,212 | 12/1975 | Tcherney | 250/527 |
| 4,011,149 | 3/1977 | Nozik | 206/129 |
| 4,042,758 | 8/1977 | Weinstein et al. | 429/111 |

OTHER PUBLICATIONS

M. S. Wrighton et al., "Photoassisted Electrolysis of Water by Irradiation of a Titanium Dioxide Electrode", Proc. Nat. Acad. Sci. USA, vol. 72, pp. 1518-1522, Apr. 1975.
D. Laser et al., "Semiconductor Electrodes-Part VI", J. Electrochem. Soc., vol. 123, pp. 1027-1030, Jul. 1976.
W. W. Anderson et al., "Becquerel Effect Solar Cell", Energy Conversion, vol. 15, pp. 85-94 (1976).

Primary Examiner—Aaron Weisstuch
Attorney, Agent, or Firm—Morris Liss; Israel Gopstein

[57] ABSTRACT

A sealed device includes an electrode having a semiconductor thin film coating. A liquid electrolyte contacts the thin film to form a photoactive interface which converts light energy to electrical energy. A counterelectrode is positioned in spaced relation to the electrode and also contacts the electrolyte. Leads are connected to the electrode and counterelectrode so that a load may be driven by the device when the device is exposed to light.

10 Claims, 3 Drawing Figures

THIN FILM PHOTOGALVANIC CELL

FIELD OF THE INVENTION

The present invention relates to photogalvanic devices and more particularly to such a device which has a thin film photoactive interface.

BRIEF DESCRIPTION OF THE PRIOR ART

In a copending application S. No. 706,078 entitled "Photogalvanic Cell Using a Transparent Conducting Electrode" by Horst Witzke, filed in the U.S. Patent and Trademark Office on July 16, 1976, and assigned to the present assignee, a sealed device was disclosed having the structure shown in FIG. 1. As shown in the figure, the $SnO_2$ electrode contacts an electrolyte which includes acid, glycerine, and $TiO_2$. The interface between this electrode and the electrolyte forms a photoactive site for achieving energy conversion from light to electrical energy. Accordingly, a load connected between the electrode and a carbon counterelectrode may draw current. Although this invention operates satisfactorily, it was found to have a disadvantageous operating characteristic. The disadvantage was in the nature of high internal impedance which may be due to poor electron transfer across the photoactive interface from the $TiO_2$ particles to the electrode.

BRIEF DESCRIPTION OF THE PRESENT INVENTION

The present invention is an improvement over the aforementioned patent application by using a $TiO_2$ thin film layer instead of suspended particles. The present invention decreases the high internal impedance which was characteristic of the mentioned prior device. By not using suspended $TiO_2$ powder particles in the electrolyte, the photoactive interface or junction is modified in a manner which permits a more efficient transfer of electrons across the junction. Accordingly, a more efficient energy conversion may be realized by a device of this sort.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
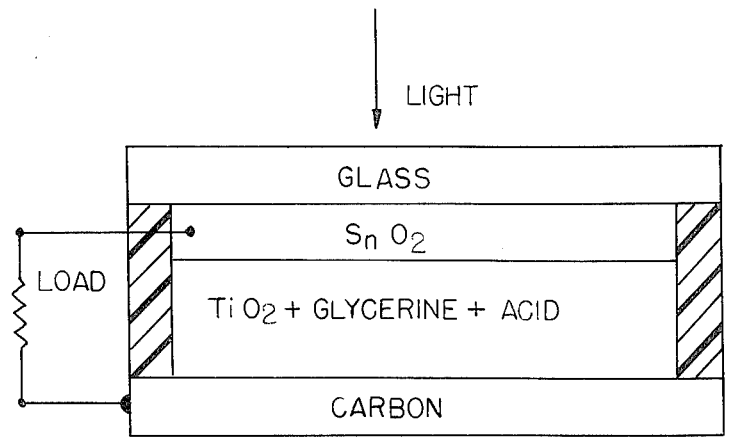
FIG. 1 is a diagrammatic cross sectional view of a prior art device as referenced above.
Figure 2:
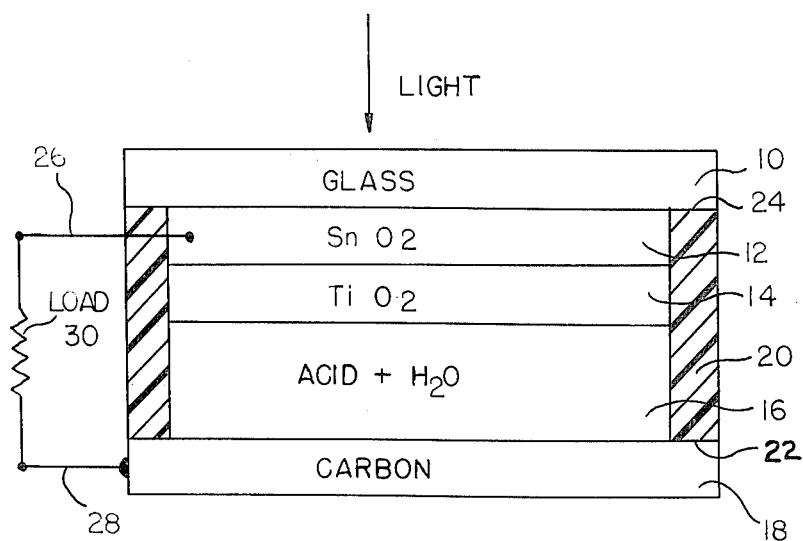
FIG. 2 is a diagrammatic cross sectional view of a first embodiment of the invention.

Referring to the figures and more particularly FIG. 2 thereof, an improved structure, forming a first embodiment of the invention is illustrated. In essence, as previously mentioned, the invention as exemplified in the first embodiment of FIG. 2 is similar in structure to the stated prior art as shown in FIG. 1. However, rather than using $TiO_2$ power in the electrolyte layer, a thin film of this oxide material is created and coats the top electrode. This enhances the electron transfer at the photoactive junction or interface created between the electrolyte and the $TiO_2$ thin film.

Considering the actual structure of the first embodiment, a glass substrate 10 has a conductive film 12 coated thereon to form an electrode. The glass-conductive film combination may be readily purchased as a prefabricated material known as Nesa glass. In such an event, the conductive material used for the electrode is semiconducting $SnO_2$. Below the electrode 12 is a metal oxide thin film layer 14 fabricated from a metal oxide such as $TiO_2$ which may be sputter deposited or deposited by chemical vapor deposition onto the electrode 12. The thickness of the $TiO_2$ layer is typically 2,000 Angstroms.

The electrolyte layer 16 is a liquid including water and acid or base. As illustrated in FIG. 2, there is no suspending agent such as glycerine necessary as was the case when $TiO_2$ powder particles were suspended in the electrolyte layer as shown in the prior art of FIG. 1. The interface between thin film layer 14 and the electrolyte 16 forms a photoactive junction or interface where energy is converted from irradiating light to electrical charges which may be withdrawn from the device as electricity. A counterelectrode 18 is positioned in parallel spaced relationship to the $TiO_2$ layer 14. The charges generated by the device may be withdrawn through wires 26 and 28 respectively connected between the electrode 12 and the counterelectrode 18. In order to seal the device to prevent the depletion of electrolyte, an inert insulating wall 20, which may be epoxy, is bonded at its transverse edges to the glass substrate 10 and the carbon counterelectrode 18.

The counterelectrode 18 may be a disc or plate of carbon or platinized carbon. The electrolyte is of the type mentioned in U.S. Pat. No. 3,925,212 to Tchernev issued Dec. 9, 1975, and entitled "Device for Solar Energy Conversion by Photo-Electrolytic Decomposition of Water." An appropriate electrolyte thickness is approximately 1 millimeter.

In order to permit the bonding of the upper transverse edge of the wall 20, the $SnO_2$ electrode 12 may be etched along surface 24 to permit a direct bond. A similar bonding surface is present at 22 and is defined between the lower transverse edge of wall 20 and the counterelectrode 18.

A load 30 is shown connected between the wires 26 and 28. In operation of the device, the load may draw current when the device is exposed to light energy. When the light energy is no longer irradiating the device, the load current will quickly decrease to zero.

Figure 3:
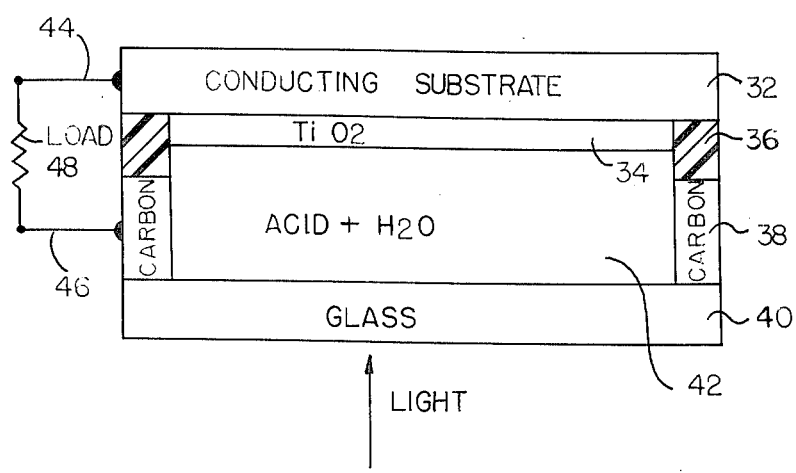
FIG. 3 is a diagrammatic cross sectional view of a second embodiment of the present invention.

FIG. 3 illustrates a second embodiment of the invention. In this embodiment the previous carbon counterelectrode 18 has its geometry changed so that rather than representing a flat disc or plate it is milled or otherwise machined into a ring 38 and is located in a manner surrounding the electrolyte layer 42 which is of the same material and thickness as the electrolyte layer 16, mentioned in connection with FIG. 2. In this way, the lowest illustrated layer can be fabricated as a glass disc 40 that is transparent to light, thus permitting the light to also pass through the electrolyte and impinge upon the $TiO_2$ layer 34 which exposes the photoactive interface or junction between layer 34 and electrolyte 42 to direct light.

The structure of FIG. 3 includes a conducting substrate 32 forming the topmost layer as typically illustrated. The conducting substrate 32 may be fabricated from platinum, titanium or other suitable materials. The substrate may be an opaque metallic material. In the case of titanium, the $TiO_2$ thin film layer 34 may be fabricated by oxidizing titanium foil, in which case the unoxidized layer 32 of the oxidized foil acts as the conductor. The layer 34 may typically be in the order of 2,000 Angstroms thick.

It is necessary to electrically insulate the conducting substrate 32 from the carbon counterelectrode ring 38 which is done by positioning an epoxy or other suitable insulative spacer 36 between the substrate 32 and the counterelectrode ring 38.

Wires 44 and 46 are respectively connected to the substrate 32 and counterelectrode ring 38 so that a load 48 connected between the wires may draw current when the device is subjected to irradiating light. With respect to both embodiments of FIGS. 2 and 3, it is essential that the device be properly sealed against leakage to prevent depletion of the electrolyte. This is in marked contrast to the previously mentioned U.S. Pat. No. 3,925,212 which purposely permits venting from the electrolyte so that hydrogen gas may be drawn as the electrolyte becomes depleted.

It should be understood that the invention is not limited to the exact details of construction shown and described herein for obvious modifications will occur to persons skilled in the art.

We claim the following:

1. A photogalvanic cell comprising: light transmissive means:
    a fluid electrolyte sealed within the cell;
    a first electrode positioned in contact with the electrolyte;
    a second electrode insulated from the first electrode and spaced therefrom;
    means connected to the electrodes for conducting electricity generated by said cell from the cell;
    at least one of said electrodes being associated with means enclosing said cell; and
    a thin film of $TiO_2$ contacting the second electrode at a first surface of the thin film, the opposite surface contacting the electrolyte to form a photoactive interface capable of converting light energy to electrical energy.

2. The subject matter set forth in Claim 1 wherein the first and second electrodes are positioned in parallel spaced relationship to each other.

3. The subject matter set forth in Claim 2 wherein the first electrode is opaque and serves as a seal against electrolyte leakage.

4. The subject matter set forth in Claim 2 wherein said thin film of $TiO_2$ is light transmissive, and wherein a transparent member is outwardly disposed over the second electrode for sealing a corresponding end of the cell and admitting light to the photoactive interface.

5. The subject matter set forth in claim 2 wherein the $TiO_2$ is utilized in its rutile form.

6. The subject matter set forth in claim 2 wherein the $TiO_2$ is utilized in its anatase form.

7. The subject matter set forth in Claim 1 wherein the first electrode is an annular member transversely positioned with respect to the second electrode and further wherein the first electrode encloses the electrolyte.

8. The subject matter set forth in Claim 3 wherein said second electrode is positioned toward one end of said cell, and further including a transparent electrolyte sealing member positioned towards an opposite end of said cell permitting light passage therethrough to the photoactive interface.

9. The subject matter set forth in claim 8 wherein the $TiO_2$ is utilized in its rutile form.

10. The subject matter set forth in claim 8 wherein the $TiO_2$ is utilized in its anatase form.

* * * * *